United States Patent
Oh

(10) Patent No.: US 9,526,989 B2
(45) Date of Patent: Dec. 27, 2016

(54) METHOD AND APPARATUS FOR RECEIVING GAME STREAMING DATA, AND METHOD AND SERVER FOR TRANSMITTING GAME STREAMING DATA

(75) Inventor: Zhang-hoon Oh, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 13/590,835

(22) Filed: Aug. 21, 2012

(65) Prior Publication Data

US 2013/0059654 A1 Mar. 7, 2013

(30) Foreign Application Priority Data

Sep. 1, 2011 (KR) .................. 10-2011-0088531

(51) Int. Cl.
*A63F 13/71* (2014.01)
*A63F 13/77* (2014.01)

(52) U.S. Cl.
CPC .............. *A63F 13/71* (2014.09); *A63F 13/77* (2014.09); *A63F 2300/552* (2013.01); *A63F 2300/5513* (2013.01); *A63F 2300/5586* (2013.01)

(58) Field of Classification Search
USPC ..................................... 463/29, 42
See application file for complete search history.

(56) References Cited

U.S. PATENT DOCUMENTS

| 7,890,381 B1* | 2/2011 | Lyskovsky | G06Q 30/02 705/26.8 |
| 8,881,304 B2* | 11/2014 | Vrielink | G06F 21/10 726/26 |
| 2007/0220575 A1* | 9/2007 | Cooper et al. | 725/118 |
| 2008/0195970 A1* | 8/2008 | Rechsteiner | G06F 17/30056 715/810 |
| 2009/0119737 A1 | 5/2009 | Perlman et al. | |
| 2009/0150553 A1* | 6/2009 | Collart et al. | 709/229 |
| 2010/0293598 A1* | 11/2010 | Collart et al. | 726/3 |
| 2011/0054980 A1* | 3/2011 | Simons | G06Q 10/10 705/7.37 |
| 2012/0122552 A1* | 5/2012 | Youm | A63F 13/10 463/23 |
| 2012/0278439 A1* | 11/2012 | Ahiska et al. | 709/218 |
| 2012/0283017 A1* | 11/2012 | Ahiska et al. | 463/40 |
| 2013/0166906 A1* | 6/2013 | Swaminathan | H04L 65/4084 713/155 |

FOREIGN PATENT DOCUMENTS

KR 10-2005-0016149 A 2/2005

* cited by examiner

*Primary Examiner* — Jason Skaarup
(74) *Attorney, Agent, or Firm* — Sughrue Mion, PLLC

(57) ABSTRACT

A game streaming data providing method and server for assigning some control rights for a game to a user terminal that participates in the game, and a method and apparatus for receiving game streaming data. The game streaming data providing method, may obtaining game list information from the server; displaying the game list information; transmitting to the server information regarding a game selected by a first user, and game setting information permitting a second user to participate in the game; and receiving control right information and game streaming data regarding the game from the server, wherein the control right information comprises at least one of first control right information defining a range of control rights for the game assigned to the first user, and second control right information defining a range of control rights for the game assigned to the second user.

13 Claims, 9 Drawing Sheets

FIG. 10

| ORDER | GAME NAME | PRICE | USER EVALUATION | |
|---|---|---|---|---|
| 1 | F.E.A.R2 : Project orgin | $12.99 | ★★ | |
| 2 | Just Cause 2 | $4.99 | ★★★ | |
| 3 | LEGO Harry Potter | $5.99 3-day $29.99 full | ★★★★★ | — 1010 |
| 4 | Kane & Lynch2 | $3.99 | ★ | |
| 5 | LEGO Batran | free | ★★ | |
| 6 | | | | |

FIG. 11 mycloudgamescheme://my.cloud.game.samsung.com/game?session_id=af04cd8631 &  ...1110
&input_method_preset=31fc6783  ...1120

METHOD AND APPARATUS FOR RECEIVING GAME STREAMING DATA, AND METHOD AND SERVER FOR TRANSMITTING GAME STREAMING DATA

CROSS-REFERENCE TO RELATED PATENT APPLICATION

This application claims priority from Korean Patent Application No. 10-2011-0088531 filed on Sep. 1, 2011, in the Korean Intellectual Property Office, the disclosure of which is incorporated herein in its entirety by reference.

BACKGROUND

1. Field

Methods and apparatuses consistent with the present inventive concept relate to a method of receiving game streaming data regarding a particular game permitting accessory participation, and a method of transmitting game streaming data to a user terminal.

2. Description of the Related Art

Game industries that have been steadily growing all over the world are expected to create demand for low-priced terminals, or demand for a function of allowing the playing of games on a television (TV). Game streaming services have been developed to satisfy such demands.

According to a game streaming technique, a plurality of cloud nodes are formed on a large-scale, and computer games are played in the cloud nodes rather than in a game console or a high-performance personal computer (PC). Images of a game formed at a cloud node are transmitted and reproduced in a user terminal according to a streaming method, via a wired/wireless network, and a user input generated in the user terminal is directly transmitted to the cloud node and reflected in the game.

A cloud computing-based game streaming service needs to provide game service quality similar to that of game consoles or high-performance PCs and should thus satisfy the following four requirements.

First, high responsiveness, as achieved in a personal game console, should be guaranteed. In the case of a first-person shooting game, it is known that a terminal-to-terminal delay time should be 100 msec or less. However, this requirement is difficult to satisfy, since game images and user inputs are transmitted via a wired/wireless network; such data takes a lot of time to transmit.

Second, a high image quality should be provided. Image data is transmitted at a maximum compression rate in order to service high-quality images (e.g., 720 p or more) of a high-performance game by using a limited network bandwidth. However, in this case, compression complexity is increased and it thus takes a lot of time to compress the image data, thereby degrading game responsiveness.

Third, high responsiveness and high image quality should be maintained constantly. When services are provided using network resources shared by a large number of people, game responsiveness and image quality are likely to be degraded. Thus, uniform service quality needs to be provided while minimizing degradation in game responsiveness and image quality.

Fourth, a service system should be constructed at low cost. Since cloud nodes involve expensive equipment, each including a high-performance central processing unit (CPU) and a graphics processing unit (GPU), it is expensive for a service provider to form cloud nodes on a large-scale. Furthermore, if a user wants to use services via a low-priced PC or a mobile terminal and has to pay a high price to construct cloud nodes, particularly, if a user has to pay more than if he/she builds a high-performance PC, then it may be impossible for a service provider to run a viable service business by using cloud nodes.

SUMMARY

According to an aspect of an exemplary embodiment, there is provided a method of receiving streaming game data from a server, the method including: obtaining game list information from the server; displaying the game list information; transmitting to the server information regarding a game selected by a first user, and game setting information permitting a second user to participate in the game; and receiving control right information and game streaming data regarding the game from the server, wherein the control right information comprises at least one from among first control right information defining a range of control rights for the game assigned to the first user, and second control right information defining a range of control rights for the game assigned to the second user.

The first control right information and the second control right information may vary according to a processing status of the game.

The game setting information may include selection information for first control rights and second control rights.

The method may further include obtaining link information from the server, the link information being generated based on at least one from among identification information regarding the game and the control right information.

The method may further include transmitting the link information to at least one from among a social network service (SNS) server and a second user terminal.

The method may further include if the second user participates in the game, receiving participation information of the second user from the server.

According to an aspect of an exemplary embodiment, there is provided a method of receiving game streaming data regarding a game in which a first user permits a second user to participate, the method including: transmitting participation request information regarding the game to the server; receiving from the server control right information and the game streaming data regarding the game in which the second user participates, wherein the control right information comprises at least one from among first control right information defining a range of control rights for the game assigned to the first user, and second control right information defining a range of control rights for the game assigned to the second user; and displaying the game streaming data based on the control right information.

The transmitting of the participation request information may include: obtaining link information regarding the game; and transmitting, based on the link information, the participation request information regarding the game.

The link information may include at least one from among identification information regarding the game and the control right information.

The first control right information and the second control right information may vary according to a processing status of the game.

The method may further include receiving from the server standby information of the second user, the standby information being related to the game.

According to an aspect of an exemplary embodiment, there is provided a method of providing game streaming data, the method including: receiving from a first user terminal information regarding a game selected by a first user and game setting information permitting participation of a second user in the game; receiving from a second user terminal participation request information regarding the game; and transmitting control right information and the game streaming data regarding the game to the first user terminal or the second user terminal, wherein the control right information comprises at least one from among first control right information defining a range of control rights for the game assigned to the first user, and second control right information defining a range of control rights for the game assigned to the second user.

The method may further include splitting control rights for the game into the first control rights and the second control rights.

The method may further include: generating link information based on at least one from among identification information regarding the game and the control right information; and transmitting the link information to at least one from among a social network service (SNS) server and the second user terminal.

The method may further include: receiving, based on the link information, the participation request information regarding the game from the second user terminal; and analyzing link information included in the participation request information.

The method may further include managing standby information of the second user, the standby information being related to the game.

According to an aspect of an exemplary embodiment, there is provided an apparatus for receiving game streaming data, the apparatus including: a display unit which obtains game list information from a server and displaying the game list information; a transmission unit which transmits to the server information regarding a game selected by the first user, and game setting information permitting a second user to participate in the game; a receiving unit which receives control right information and game streaming data regarding the game from the server, wherein the control right information comprises at least one from among first control right information defining a range of control rights for the game assigned to the first user, and second control right information defining a range of control rights for the game assigned to the second user; and a controller which controls the display unit, the transmission unit, and the receiving unit.

The receiving unit may receive link information from the server, the link information being generated based on at least one from among identification information regarding the game and the control right information.

The transmission unit may transmit the link information to at least one from among a social network service (SNS) server and a second user terminal.

If the second user participates in the game, the receiving unit receives participation information of the second user from the server.

According to an aspect of an exemplary embodiment, there is provided an apparatus for receiving game streaming data, the apparatus including: a transmission unit which transmits participation request information regarding a game in which a first user permits a second user to participate, to the server; a receiving unit which receives from the server control right information and game streaming data regarding the game in which the second user participates, wherein the control right information comprises at least one from among first control right information defining a range of control rights for the game assigned to the first user, and second control right information defining a range of control rights for the game assigned to the second user; a display unit which displays the game streaming data based on the control right information; and a controller which controls the transmission unit, the receiving unit, and the display unit.

The receiving unit may receive link information regarding the game, and the transmission unit may transmit, based on the link information, the participation request information regarding the game.

The link information may include at least one from among identification information regarding the game and the control right information.

The receiving unit may receive from the server standby information of the second user, the standby information being related to the game.

According to an aspect of an exemplary embodiment, there is provided a server for providing game streaming data, the server including: a receiving unit which receives from a first user terminal information regarding a game selected by a first user and game setting information permitting participation of a second user in the game, and receives participation request information regarding the game from a second user terminal; a transmission unit which transmits control right information and game streaming data regarding the game to the first user terminal or the second user terminal, wherein the control right information comprises at least one from among first control right information defining a range of control rights for the game assigned to the first user, and second control right information defining a range of control rights for the game assigned to the second user; and a controller which controls the receiving unit and the transmission unit.

The controller may split control rights for the game into the first control rights and the second control rights.

The server may further include a link information generator which generates link information based on at least one from among identification information regarding the game and the control right information, and wherein the transmission unit may transmit the link information to at least one from among a social network service (SNS) server and the second user terminal.

If the participation request information regarding the game is received from the second user terminal, based on the link information, the controller may analyze the link information included in the participation request information.

The server may further include a standby manager which manages standby information of the second user, the standby information being related to the game.

According to an aspect of an exemplary embodiment, there is provided a computer readable recording medium having recorded thereon a program for executing a method a method of receiving streaming game data from a server, the method including: obtaining game list information from the server; displaying the game list information; transmitting to the server information regarding a game selected by a first user, and game setting information permitting a second user to participate in the game; and receiving control right information and game streaming data regarding the game from the server, wherein the control right information comprises at least one from among first control right information defining a range of control rights for the game assigned to the first user, and second control right information defining a range of control rights for the game assigned to the second user.

According to an aspect of an exemplary embodiment, there is provided a computer readable recording medium having recorded thereon a program for executing a method receiving game streaming data regarding a game in which a first user permits a second user to participate, the method including: transmitting participation request information regarding the game to the server; receiving from the server control right information and the game streaming data regarding the game in which the second user participates, wherein the control right information comprises at least one from among first control right information defining a range of control rights for the game assigned to the first user, and second control right information defining a range of control rights for the game assigned to the second user; and displaying the game streaming data based on the control right information.

According to an aspect of an exemplary embodiment, there is provided computer readable recording medium having recorded thereon a program for executing a method of providing game streaming data, the method including: receiving from a first user terminal information regarding a game selected by a first user and game setting information permitting participation of a second user in the game; receiving from a second user terminal participation request information regarding the game; and transmitting control right information and the game streaming data regarding the game to the first user terminal or the second user terminal, wherein the control right information comprises at least one from among first control right information defining a range of control rights for the game assigned to the first user, and second control right information defining a range of control rights for the game assigned to the second user.

BRIEF DESCRIPTION OF THE DRAWINGS

The above and other features will become more apparent by describing in detail exemplary embodiments thereof with reference to the attached drawings in which:

FIG. 10 is a table illustrating game list information according to an exemplary embodiment;

FIG. 11 is a diagram illustrating link information according to an exemplary embodiment;

DETAILED DESCRIPTION

Figure 1:
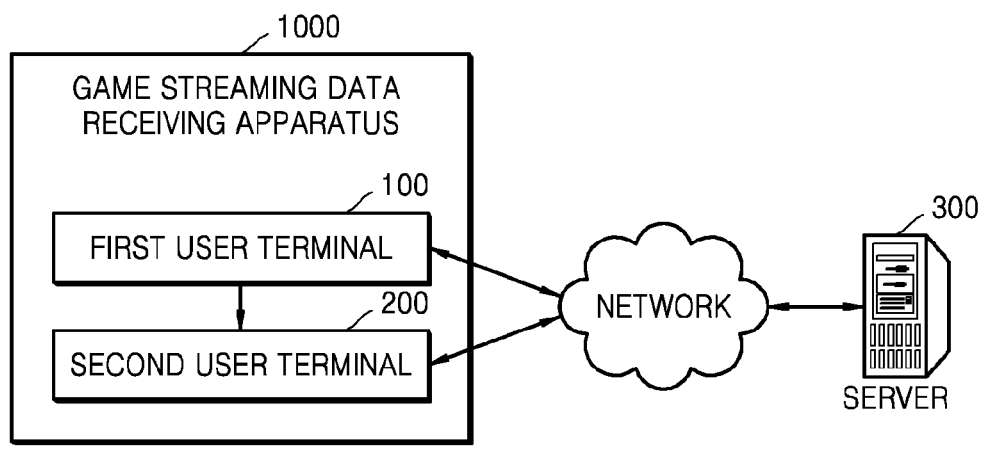
FIG. 1 is a block diagram of a game streaming service system according to an exemplary embodiment.

First, the terms used in the present disclosure will be briefly described below before exemplary embodiments are described in greater detail.

Most of the terms used herein are general terms that have been widely used in the technical art. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context as set forth herein.

In the present specification, it should be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Also, the terms, such as 'unit' or 'module', etc., should be understood as a unit that processes at least one function or operation and that may be embodied in a hardware manner, a software manner, or a combination of the hardware manner and the software manner.

As used herein, the term 'and/or' includes any and all combinations of one or more of the associated listed items. Expressions such as 'at least one of,' when preceding a list of elements, modify the entire list of elements and do not modify the individual elements of the list.

Throughout the specification, the term 'game' means a game program played via a computing device. According to an exemplary embodiment, examples of games may include sports games, e.g., a tennis game, a badminton game, and a ball game, such as football or basketball, role playing games, card games, board games, fighting games, shooting games, quiz games, musical instrument games, e.g., a piano game or a guitar game, and the like. Also, examples of games according to an exemplary embodiment may include not only one-player games but also multiplayer games.

Hereinafter, exemplary embodiments will now be described more fully with reference to the accompanying drawings. The present inventive concept may, however, be embodied in many different forms and should not be construed as being limited to the exemplary embodiments set forth herein. Rather, these exemplary embodiments are provided so that this disclosure will be thorough and complete and will fully convey the concept of the inventive concept to those of ordinary skill in the art. In the following description, well-known functions or constructions are not described in detail as they would obscure explanation of the exemplary embodiments in unnecessary detail. The same reference numerals represent the same elements throughout the drawings.

FIG. 1 is a block diagram of a game streaming service system according to an exemplary embodiment. The game streaming service system may include a game streaming data receiving apparatus 1000 and a server 300.

According to an exemplary embodiment, the game streaming data receiving apparatus 1000 is a user device capable of receiving game streaming data. The game streaming data receiving apparatus 1000 may include a plurality of user terminals including a first user terminal 100 and a second user terminal 200.

According to an exemplary embodiment, a first user may be a main participant of a particular game allowing accessory participation, and the first user terminal 100 may be a terminal that the first user who is a main participant of a particular game uses.

Also, a second user may be a user who participates in a particular game permitting accessory participation or who observes a particular game. The second user terminal 200 may be a terminal that the second user, who accessorily participates in a particular game, uses. Thus, according to an exemplary embodiment, the first user may have a wider range of control rights, i.e., with respect to a particular game allowing accessory participation, than the second user.

The first user terminal 100 and the second user terminal 200 may be connected to the server 300 via wired/wireless communication. In this case, the first user terminal 100 or the second user terminal 200 may receive and decode encoded game streaming data from the server 300.

According to an exemplary embodiment, the first user terminal 100 and the second user terminal 200 may have any of various shapes. The first user terminal 100 and the second user terminal 200 may be embodied as not only fixed terminals, e.g., desk-top PCs and Internet Protocol TVs (IPTVs), which are fixedly installed on a particular location but also mobile terminals.

In the present specification, examples of mobile terminals include mobile phones, smart phones, laptop computers, digital broadcasting terminals, personal digital assistants (PDAs), portable multimedia players (PMPs), navigation, tablet PCs, MP3 players, digital cameras, and the like.

The server 300 is a server for providing game streaming services to the first user terminal 100 and the second user terminal 200. According to an exemplary embodiment, the server 300 may be a cloud computing-based virtual server.

In other words, according to an exemplary embodiment, the first user terminal 100 or the second user terminal 200 receives game data according to a streaming method via a cloud computing-based virtual server. Thus, there is no need to install an additional game program in the first user terminal 100 or the second user terminal 200. Since game code is executed in the server 300, the game code may be prevented from being exposed to the outside. Also, a game may be patched or upgraded in the server 300 rather than in a user terminal. Thus, the game may be easily patched or upgraded, and user convenience may be improved.

According to an exemplary embodiment, the server 300 may provide game list information to the first user terminal 100 or the second user terminal 200.

In this case, the server 300 may receive a request for game participation from the first user terminal 100 or the second user terminal 200.

The server 300 may encode game data including a game screen or a game streaming data. The server 300 may transmit the encoded game data to the first user terminal 100 or the second user terminal 200. A structure of the server 300 according to an exemplary embodiment will be described with reference to FIG. 4 below.

Figure 2:
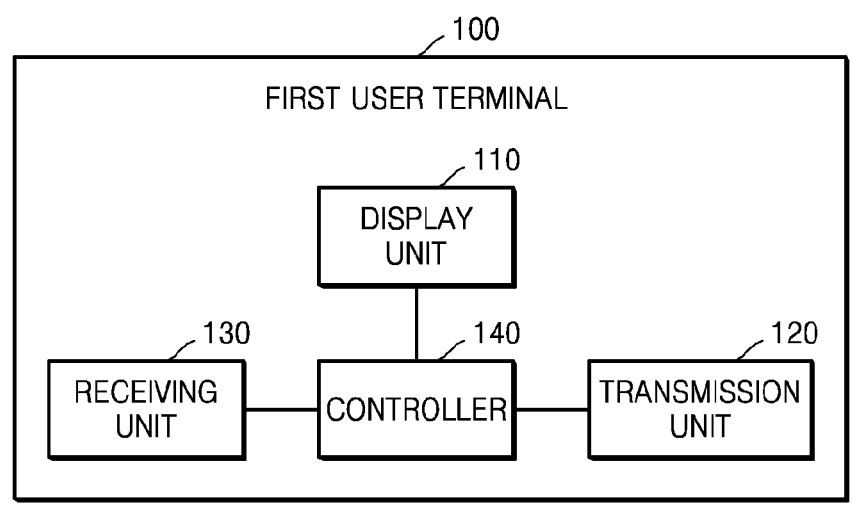
FIG. 2 is a block diagram of a first user terminal according to an exemplary embodiment.

FIG. 2 is a block diagram of a first user terminal 100 according to an exemplary embodiment. Referring to FIG. 2, the first user terminal 100 may include a display unit 110, a transmission unit 120, a receiving unit 130, and a controller 140 but are not limited thereto. In other words, the first user terminal 100 may include only some of these elements or may further include other elements.

The display unit 110 may display game list information received from the server 300. According to an exemplary embodiment, the game list information may include the name, content, rules, and a part of images of a game, the number of persons that can participate in the game, and the like.

The display unit 110 may also display game streaming data received from the server 300. According to an exemplary embodiment, the game streaming data may include two-dimensional (2D) images or three-dimensional (3D) images.

According to an exemplary embodiment, when the first user terminal 100 accesses the server 300 of FIG. 1, the display unit 110 may receive a list of games that a first user owns, information regarding the list of the games, and information regarding users who are acquaintances of the first user, e.g., information regarding friends registered with a social network service (SNS) server, a list of games that the first user's friends own, and information regarding the games that the first user's friends are playing, from the server 300, and then may display the information.

According to an exemplary embodiment, the first user terminal 100 may further include a user input unit (not shown). The first user terminal 100 may receive selection information for selecting a particular game and game setting information compiled by the first user from the first user via the user input unit.

For example, the first user may select a desired game based on the displayed game list information, and may determine whether to permit a second user to accessorily participate in the selected game.

The transmission unit 120 may transmit information regarding the selected game and game setting information indicating whether accessory participation is permitted, to the server 300. According to an exemplary embodiment, the game setting information may include selection information regarding first control rights and second control rights for selecting first control rights and second control rights. That is, the first user may set a control right to be assigned to each of the first and second users related to a particular game.

The transmission unit 120 may also transmit control information of the first user regarding the particular game to the server 300. For example, when the first user gives a command to move a character by manipulating direction keys, the transmission unit 120 may transmit the command to the server 300.

According to an exemplary embodiment, the transmission unit 120 may transmit link information received from the server 300 to at least one from among an SNS server (not shown) and the second user terminal 200 of FIG. 1. An SNS is a service enabling users to form social networks on a web. Representative examples of SNS include 'Twitter', 'Cyworld', 'Facebook', etc.

The receiving unit 130 may receive control right information, and game streaming data regarding a particular game from the server 300. The control right information includes at least one from among first control right information regarding a range of the first user's control right, and second control right information regarding a range of the second user's control right. Here, 'control right' means a right to control overall matters regarding the particular game when the particular game is played. According to an exemplary embodiment, the first control right information and the second control right information may vary according to a current processing status of a particular game.

The game streaming data is result of game playing by merging control input from the first user terminal 100 and control input from the second user terminal 200 into one control input.

According to an exemplary embodiment, if the first user permits accessory participation of another user with respect to a particular game, then the receiving unit 130 may obtain link information, which is generated based on at least one from among identification (ID) information regarding the particular game and the control right information, from the server 300. In this case, the first user may guide the second user to participate in the particular game, based on the link information.

If the second user accessorily participates in the particular game, the receiving unit 130 may receive participation information regarding participation of the second user from the server 300. According to an exemplary embodiment, the participation information may include information indicating whether the second user participates in the particular game, an identifier of the second user, personal information regarding the second user, e.g., age, sex, residential area, etc. In other words, the first user terminal 100 may provide the first user with information indicating whether the second user accessorily participates in the particular game, and the personal information regarding the second user.

The controller 140 may control overall operations of the receiving unit 110, the display unit 120, the transmission unit 140, the user input unit, and a memory (not shown).

According to an exemplary embodiment, the controller 140 may run one instance of game in the server 300 that merges control input from the first user terminal 100 and control input from the second user terminal 200 into one control input.

Figure 3:
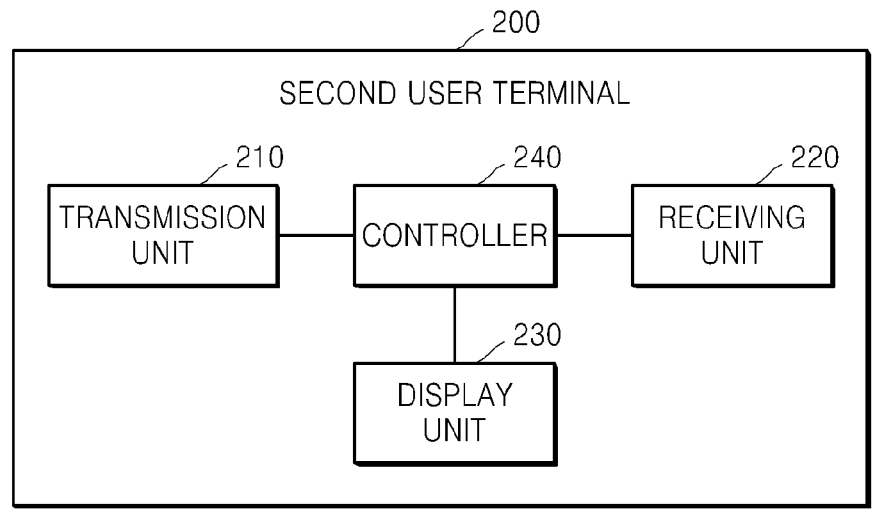
FIG. 3 is a block diagram of a second user terminal according to an exemplary embodiment.

FIG. 3 is a block diagram of a second user terminal 200 according to an exemplary embodiment. Referring to FIG. 3, the second user terminal 200 may include a transmission unit 210, a receiving unit 220, a display unit 230, and a controller 240 but are not limited thereto. In other words, the second user terminal 200 may include only some of these elements or may further include other elements.

The transmission unit 210 may transmit accessory participation request information to the server 300 with respect to a particular game in which a first user permits a second user to participate. The accessory participation request information may include ID information regarding the particular game, e.g., a game session identifier.

In this case, according to an exemplary embodiment, the second user terminal 200 may transmit the accessory participation request information to the server 300 of FIG. 1 by using link information received from the first user terminal 100 or the server 300 of FIG. 1. According to another exemplary embodiment, the second user terminal 200 may search for a list of games and request accessory participation in the particular game.

The receiving unit 220 may receive control right information regarding the particular game from the server 300. The control right information includes at least one from among first control right information regarding a range of the first user's control right, and second control right information regarding a range of the second user's control right. One part of game control input sequence is performed by the first user terminal 100 according to the first control right information, and the other part of game control input sequence is performed by the second user terminal 200 according to the second control right information.

The receiving unit 220 may receive game streaming data from the server 300. The game streaming data is result of game playing by merging control input from the first user terminal 100 and control input from the second user terminal 200 into one control input.

According to an exemplary embodiment, the receiving unit 220 may obtain link information regarding the particular game. In this case, the receiving unit 220 may obtain the link information from at least one from among the first user terminal 100 and the server 300.

The receiving unit 220 may receive standby information regarding the second user with respect to the particular game from the server 300. If another user accessorily participates in the particular game of the first user and is assigned a control right before the second user requests accessory participation, then the second user cannot directly, accessorily participate in the particular game and thus needs the standby information. In this case, the server 300 may transmit a message informing the second user that he or she cannot participate in the particular game at the present stage and the standby information, to the second user terminal 200. According to an exemplary embodiment, the standby information may include a waiting order, an estimated waiting period, a waiting list, and the like.

The display unit 230 may display the game streaming data, based on the control right information received from the server 300. According to an exemplary embodiment, the control right information may vary according to a current processing status of the particular game. For example, the types, shapes, and locations of manipulation keys displayed on a game screen may vary.

The display unit 230 may display game list information indicating a list of games allowing accessory participation, and may display information regarding acquaintances of the second user in an on-line state, e.g., state information of the acquaintances and information regarding games in which the acquaintances are participating.

The controller 240 may control overall operations of the transmission unit 210, the receiving unit 220, the display unit 230, a user input unit (not shown), and a memory (not shown).

Figure 4:
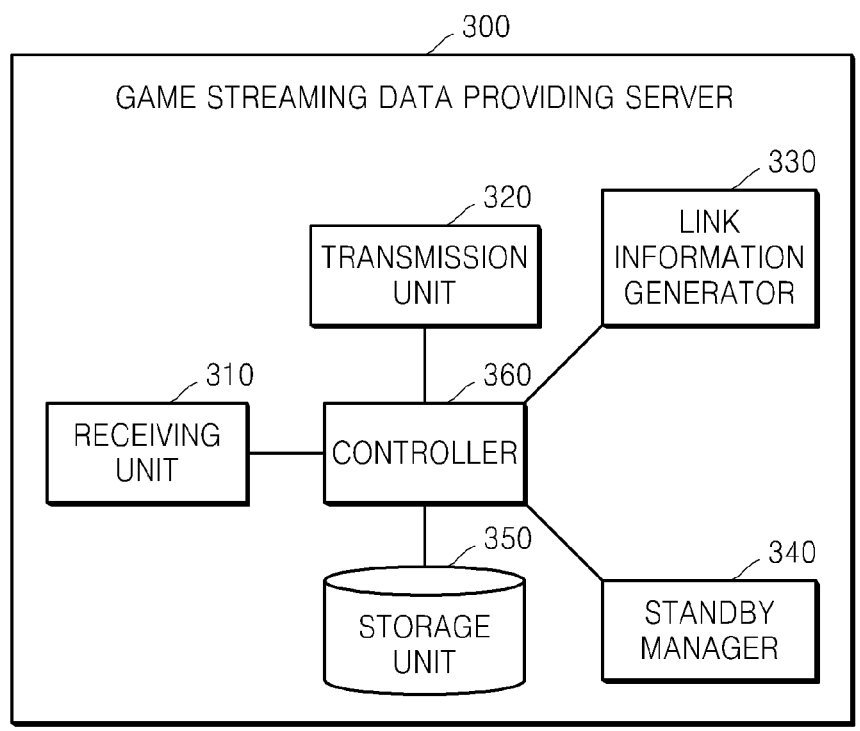
FIG. 4 is a block diagram of a server for providing game streaming data, according to an exemplary embodiment.

FIG. 4 is a block diagram of a server 300 for providing game streaming data, according to an exemplary embodiment. Referring to FIG. 4, the server 300 may include a receiving unit 310, a transmission unit 320, a link information generator 330, a standby manager 340, a storage unit 350, and a controller 360, but are not limited thereto. In other words, the server 300 may include only some of these elements, or may further include other elements.

The receiving unit 310 may receive information regarding a particular game selected by a first user, and game setting information permitting accessory participation of a second user from the first user terminal 100 of FIG. 1. The receiving unit 320 may receive accessory participation request information with respect to the particular game from the second user terminal 200 of FIG. 1. In this case, according to an exemplary embodiment, the receiving unit 320 may receive accessory participation request information from the second user terminal 200, based on link information.

The transmission unit 320 may transmit control right information, and game streaming data regarding the particular game to the first user terminal 100 or the second user terminal 200. According to an exemplary embodiment, the game streaming data is transmitted to the first user terminal 100 and second user terminal 200 simultaneously.

According to an exemplary embodiment, the control right information includes at least one from among first control right information regarding a range of the first user's control right, and second control right information regarding a range of the second user's control right. According to an exemplary embodiment, the control right information may vary according to a current processing status of a particular game.

The transmission unit 320 may transmit the link information to the first user terminal 100. Also, the transmission unit 320 may transmit the link information to an SNS server (not shown), based on SNS account information regarding the first user. The transmission unit 320 may transmit the link information to the second user terminal 200, in response to a request from the first user.

If the link information generator 330 receives the game setting information permitting accessory participation of the second user from the first user terminal 100, then the link information generator 330 may create link information regarding the particular game. The link information means information regarding a connection path via which the second user may participate in the particular game. An example of the link information may be a uniform/universal resource locator (URL). In general, the second user should take several steps to observe or accessorily participate in a particular game. However, when the link information is used, the second user terminal 200 may easily and rapidly access a particular game. For example, the second user may access the SNS server, and click (or touch) the link information. If the link information is clicked, a game application may be automatically run. Then, the second user may play the particular game together with the first user.

For convenience of explanation, it is hereinafter assumed that the link information is a URL.

According to an exemplary embodiment, the link information generator 330 may create the link information, based on at least one from among ID information regarding the particular game and the control right information. According to an exemplary embodiment, the ID information regarding the particular game may include a game session identifier.

If another user has already participated in the particular game in which the second user desires to accessorily participate, then the standby manager 340 may manage standby information regarding the second user. In other words, the standby manager 340 may manage the second user by adding the second user to a waiting list. The standby manager 340 may transmit standby information including, for example, an estimated waiting period and a waiting order, to the second user terminal 200.

The storage unit 350 may store information regarding the particular game, the control right information, and information regarding the first user and the second user. According to an exemplary embodiment, the information regarding the first user and the second user may include connection information thereof, information regarding games that the first and second users own, a number of times that each game has been played, information regarding acquaintances thereof, and so on.

Thus, according to an exemplary embodiment, the server 300 may recommend games in which the first or second user may participate to the first user terminal 100 or the second user terminal 200, based on the information regarding the games that the first and second users own, the number of times that each game has been played, and the information regarding acquaintances thereof.

The controller 360 may control overall operations of the receiving unit 310, the transmission unit 320, the link information generator 330, the standby manager 340, the storage unit 350, and the controller 360. When the first user permits the second user to accessorily participate in the particular game, the controller 360 may split control rights for the particular game into first control rights and second control rights. The splitting of the control rights may include selecting a set of first and second control rights from among a plurality of sets of first and second control rights already split from the control rights.

For example, if the control rights for the particular game includes five rights a, b, c, d, and e, then the controller 360 may split the control rights into first control rights including the rights a, b, and c, and second control rights including the rights d and e. If the control rights for the particular game include a first set of first control rights a, b, c and second control rights d and e, a second set of first control rights a, b, c, and d and a second control right e, and a third set of first control rights a and b and second control rights c, d, and e, then the controller 360 may select the first set from among the first to third sets.

If a request for accessory participation in the particular game is received from the second user terminal 200 based on the link information, the controller 360 may analyze the link information. In this case, the controller 360 may analyze the link information to extract session information and/or control right information regarding the particular game.

According to an exemplary embodiment, the controller 360 may merge control input from the first user terminal 100 and control input from the second user terminal 200 into one control input queue. Queues hold control inputs. Control inputs in the queue may be sorted by the input time. The merged control inputs in the queue are transmitted to a game instance that the first user and the second user are sharing. The controller 360 may run one instance of game and transmit merged one control input to that one game instance and share that one instance of game to two or more user's terminal.

According to an exemplary embodiment, the controller 360 may encode the game streaming data regarding the particular game. If the particular game includes bugs or errors, the controller 360 may upgrade the particular game.

Figure 5:
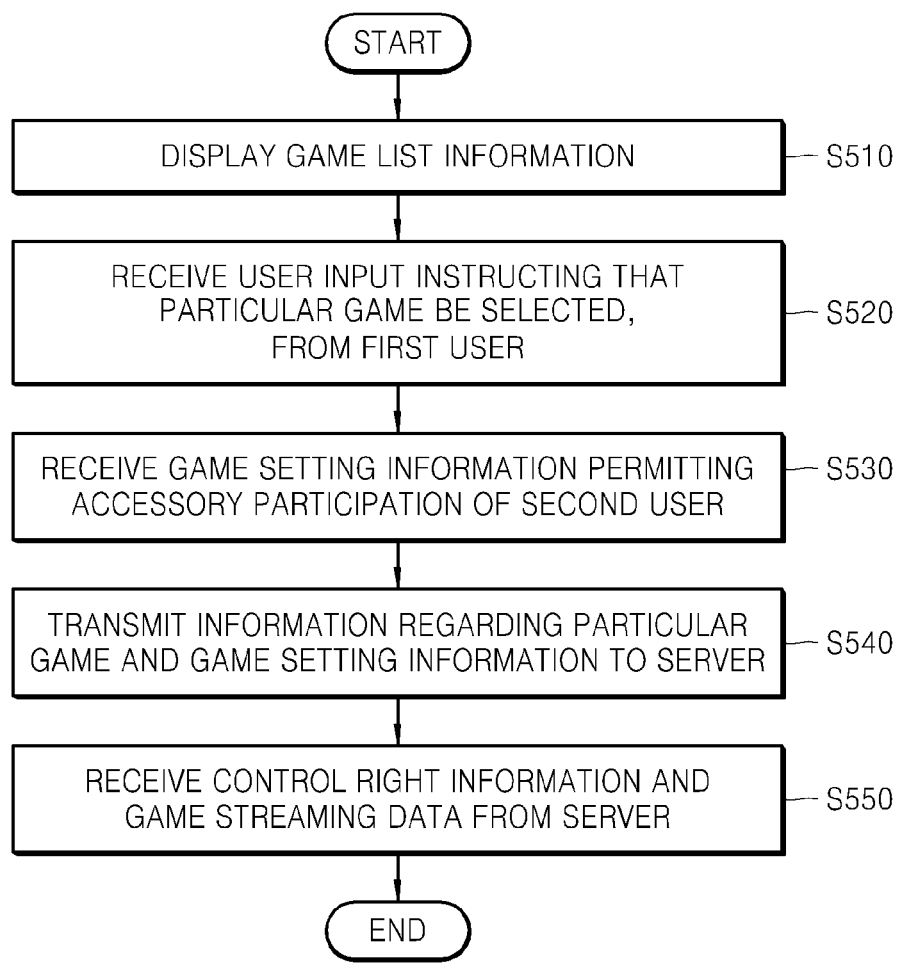
FIG. 5 is a flowchart illustrating a method of receiving game streaming data from a server, performed by a first user terminal, according to an exemplary embodiment.

FIG. 5 is a flowchart illustrating a method of receiving game streaming data from the server 300, performed by the first user terminal 100 of FIG. 1, according to an exemplary embodiment. In the method of FIG. 5, the first user terminal 100 obtains game list information from the server 300 and displays the game list information (operation S510). According to an exemplary embodiment, the game list information may include the name, content, rules, and some images of the particular game, the number of persons that can participate in the game, and the like.

For example, as illustrated in FIG. 10, the first user terminal 100 may receive game list information extracted from a database, from the server 300. The game list information may further include the price, available utility period, available age groups, evaluation information, and game developer of each game. According to an exemplary embodiment, a list of games may be recommended by the server 300, based on a first user's history of playing games, evaluation information of users, and information regarding acquaintances of the first user.

Then, the first user terminal 100 may receive a user input instructing that a particular game be selected, from the first user via a user input unit (not shown) (operation S520). The first user may select a desired game by checking the displayed game list information. For example, as illustrated in FIG. 10, the first user may select a particular game 1010 entitled 'Lego Harry Potter' from the list of games.

Then, the first user terminal 100 receives game setting information permitting accessory participation of the second user, from the first user (operation S30). If the first user desires to play the particular game 1010 together with another user, the first user may permit accessory participation of the second user.

According to an exemplary embodiment, the first user may input the game setting information permitting accessory participation of the second user while the first user is playing a game.

Then, the first user terminal 100 transmits information regarding the particular game 1010 selected by the first user, and the game setting information to the server 300 (operation S540).

Then, the first user terminal 100 may receive control right information, and game streaming data regarding the particular game 1010 from the server 300 (operation S550).

According to an exemplary embodiment, the control right information may include information regarding controllable virtual buttons, controllable game regions or characters, and controllable game time zones.

The control right information includes at least one from among first control right information regarding a range of the first user's control right, and second control right information regarding a range of the second user's control right.

In other words, according to an exemplary embodiment, the first user terminal 100 may receive the first control right information, and display game streaming data including the first control right information. For example, if the first user includes controls rights a, b, and c and the second user includes control rights d and e, then the first user terminal 100 may receive only control right information regarding the control rights a, b, and c, and display game streaming data with the control right information regarding the control rights a, b, and c, to the first user.

According to another exemplary embodiment, the first user terminal 100 may receive control right information including both first control right information and second control right information. In this case, the first user terminal 100 may display only the first control right information, or may display the first control right information and the second control right information together. If the first control right information and the second control right information are displayed together, the first user terminal 100 may display the first control right information and second control right information in different sizes or colors. For example, the first user terminal 100 may display first control rights a, b, and c in chromatic colors, and second control rights d and e in achromatic colors.

According to another exemplary embodiment, the first user terminal 100 may receive second control right information. In this case, the first user terminal 100 may deactivate a second control right from among all control rights for a particular game. For example, the first user terminal 100 may deactivate second control rights d and e from among displayed control rights a, b, c, d, and e or may hide the second control rights d and e from a game screen.

Figure 6:
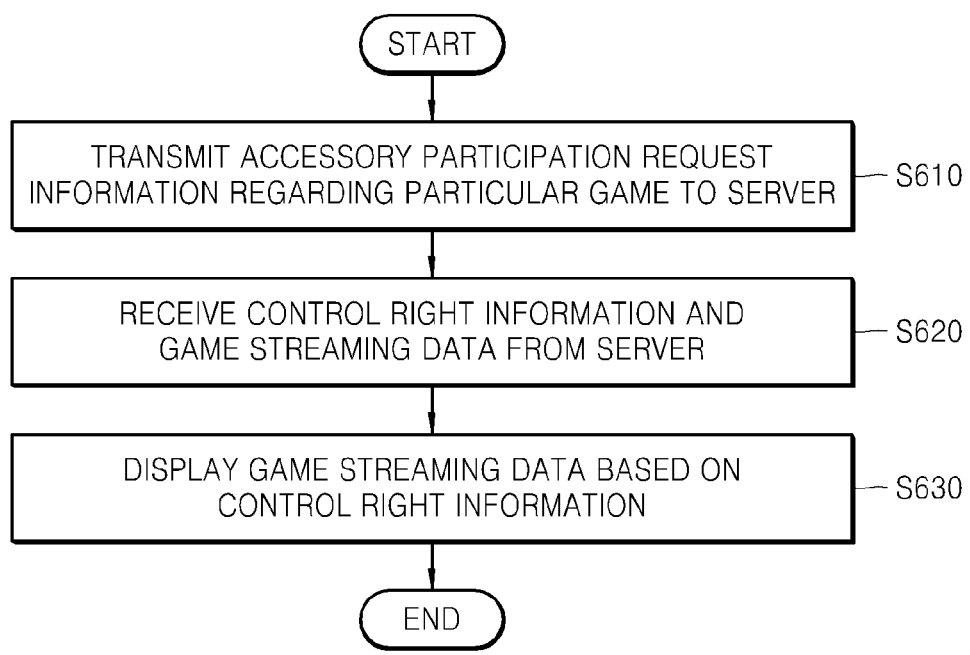
FIG. 6 is a flowchart illustrating a method of receiving game streaming data from a server, performed by a second user terminal, according to another exemplary embodiment.

FIG. 6 is a flowchart illustrating a method of receiving game streaming data from the server 300 of FIG. 1, performed by the second user terminal 200 of FIG. 1, according to another exemplary embodiment. In the method of FIG. 6, the second user terminal 200 transmits accessory participation request information with respect to a particular game to the server 300 (operation S610). According to an exemplary embodiment, the accessory participation request information may include information regarding the particular game, e.g., game ID code, session ID, information regarding a second user, e.g., the ID of the second user and the relationship between the second user and the first user, and so on.

Then, the second user terminal 200 receives control right information, and game streaming data regarding the particular game from the server 300 (operation S620). According to an exemplary embodiment, the second user accessorily participates in the particular game of the first user, and thus, the game streaming data that the second user terminal 200 receives may be the same as game streaming data that the first user terminal 100 receives.

Then, the second user terminal 200 displays the game streaming data based on the control right information received from the server 300 (operation S630). According to an exemplary embodiment, the control right information may include at least one from among first control right information regarding a range of the first user's control right, and second control right information regarding a range of the second user's control right.

Thus, according to an exemplary embodiment, the second user terminal 200 may display the second control right information included in the control right information received from the server 300. According to another exemplary embodiment, the second user terminal 200 may display the second control right information and the first control right information together. In this case, the first control right information may be displayed to be deactivated.

Figure 7:
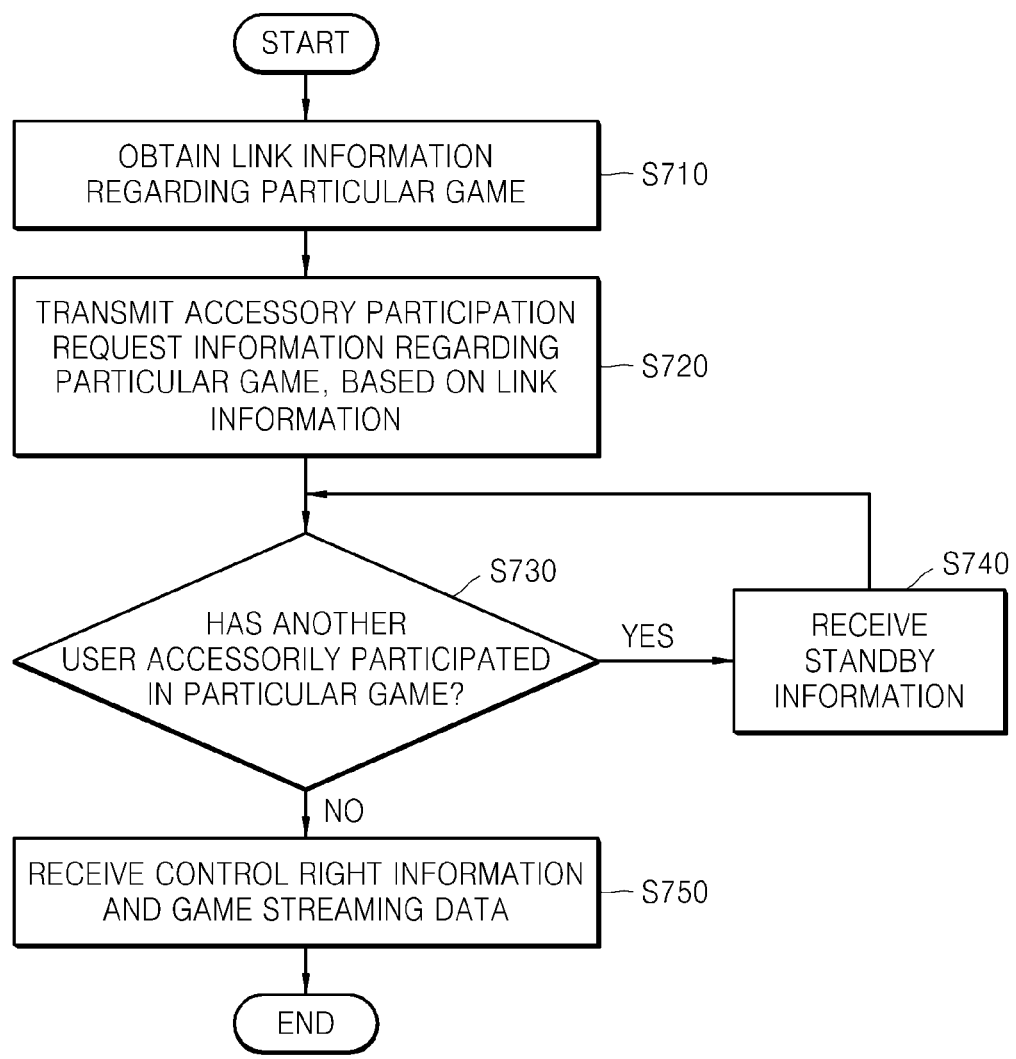
FIG. 7 is a flowchart illustrating a method of receiving game streaming data from a server based on link information, performed by a second user terminal, according to another exemplary embodiment.

FIG. 7 is a flowchart illustrating a method of receiving game streaming data from a server based on link information, performed by the second user terminal 200 of FIG. 1, according to another exemplary embodiment. In the method of FIG. 7, the second user terminal 200 receives link information regarding a particular game, e.g., a URL (operation S710). According to an exemplary embodiment, the second user terminal 200 may receive the link information from the first user terminal 100 of FIG. 1. If a first user and a second user are acquaintances, the first user terminal 100 may directly request the second user terminal 200 to accessorily participate in the particular game.

According to another exemplary embodiment, the second user terminal 200 may obtain the link information not only from the server 300 but also from an SNS server (not shown).

Then, the second user terminal 200 transmits accessory participation request information regarding the particular game, based on the link information (operation S720). According to an exemplary embodiment, the link information may include information regarding the particular game and control right information, and thus, the second user may accessorily participate in the particular game easily.

Then, it is determined whether another user is already accessorily participating in the particular game (operation S730). If it is determined in operation S730 that another user is already accessorily participating in the particular game, then the second user terminal 200 may receive standby information from the server 300 (operation S740). In other words, if a second control right included in the accessory participation request information is provided to another user who accessorily participates in the particular game, then the second user cannot accessorily participate in the particular game. In this case, the second user terminal 200 may receive standby information, for example, saying that the number of users permitted to participate in the particular game is greater than a predetermined value, a waiting time period is five minutes, and two users are awaiting', from the server 300. Then, the second user terminal 200 may standby to accessorily participate or observe the particular game.

According to an exemplary embodiment, if nobody is currently participating in the particular game, the second user terminal 200 may accessorily participate in the particular game, based on the information regarding the particular game and the control right information included in the link information. If nobody is participating in the particular game or if a user stops participation when the second user requests accessory participation, then the second user terminal 200 receives the control right information and the game streaming data from the server 300 (operation S750). In this case, the second user may support the first user to play the particular game within a range of the second control right.

Conventionally, game observers may observe a game that a game player is playing by simply receiving a stream of the game. In this case, it is difficult to attract the game observers' interests about the game. However, according to an exemplary embodiment, a second user may accessorily participate in a particular game to support a first user to play the particular game. Accordingly, it is easy to attract second users' interests about the particular game, and motivate the second users to accessorily participate in the particular game.

Figure 8:
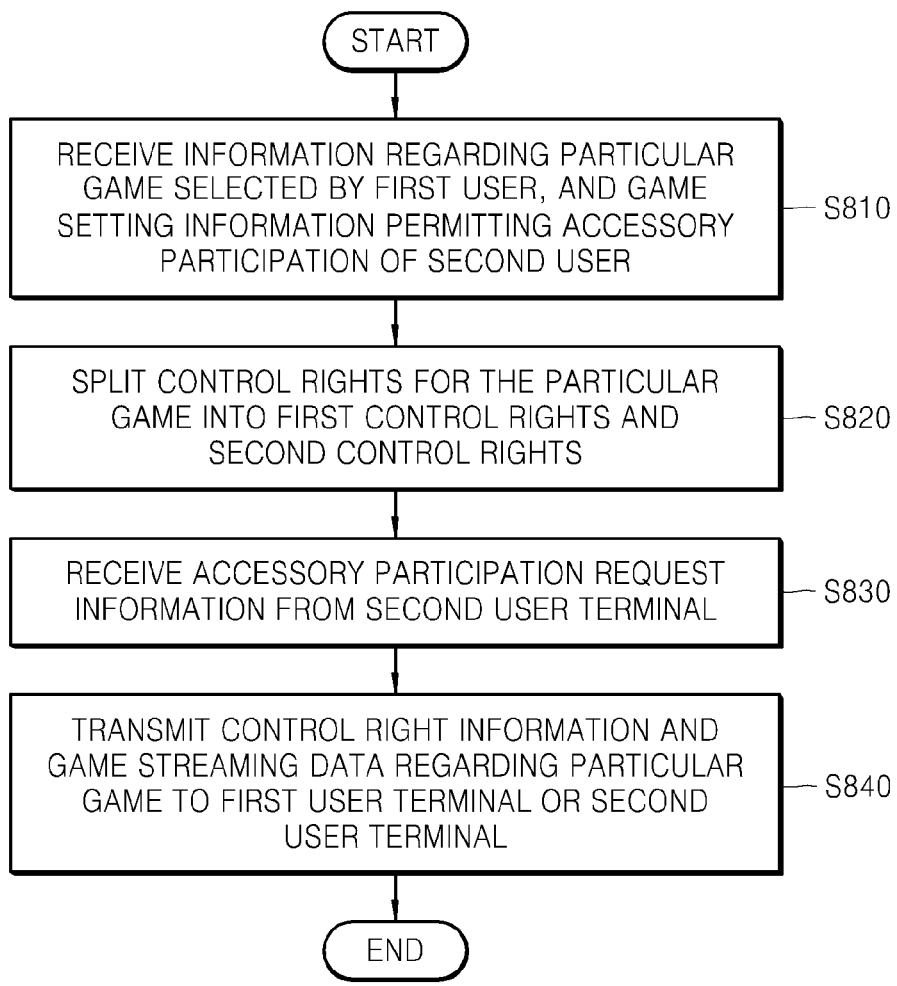
FIG. 8 is a flowchart illustrating a method of providing game streaming data, according to an exemplary embodiment.

FIG. 8 is a flowchart illustrating a method of providing game streaming data, according to an exemplary embodiment. In the method of FIG. 8, the server 300 of FIG. 1 receives information regarding a particular game selected by a first user from the first user terminal 100 of FIG. 1 (operation S810). According to an exemplary embodiment, the information regarding the particular game may include the ID information and name of the particular game. In other words, when the first user selects the particular game, the first user terminal 100 may request the particular game to be played by transmitting, for example, game ID code, to the server 300.

According to an exemplary embodiment, the server 300 may receive game setting information permitting accessory participation from the first user. Since a first user is a main player, the first user may determine whether to play the particular game alone or with help from a second user. According to an exemplary embodiment, the first user permits accessory participation before the particular game is played, or while the particular game is played.

The game setting information may include selection information regarding first control rights and second control rights for selecting first control rights and second control rights. For example, when there are a plurality of control right sets including first control rights and second control rights, then the first user may select one of the plurality of control right sets and play the particular game with the second user. According to an exemplary embodiment, while playing the particular game, the first user may replace the selected set with another set from among the plurality of sets.

Then, if the game setting information permitting accessory participation in the particular game is received, then the server 300 splits control rights for the particular game into first control rights and second control rights (operation S820). According to an exemplary embodiment, the control rights may be split according to the purpose, characteristics, and tendency of the particular game. For example, if the particular game requires manipulation of a plurality of manipulation keys, control buttons may be distributed to users. If the particular game is a role playing game, controllable characters may be distributed. If the particular game is a competition game, control rights for a specific area may be distributed. If the particular game is a sports game, control rights for game sets or game times may be distributed. For example, the first control rights may be assigned to first and third game sets, and the second control rights may be assigned to a second game set. Otherwise, the first control rights may be assigned to be maintained for thirty minutes, and the second control rights may be assigned to be maintained for ten minutes.

Figure 12:
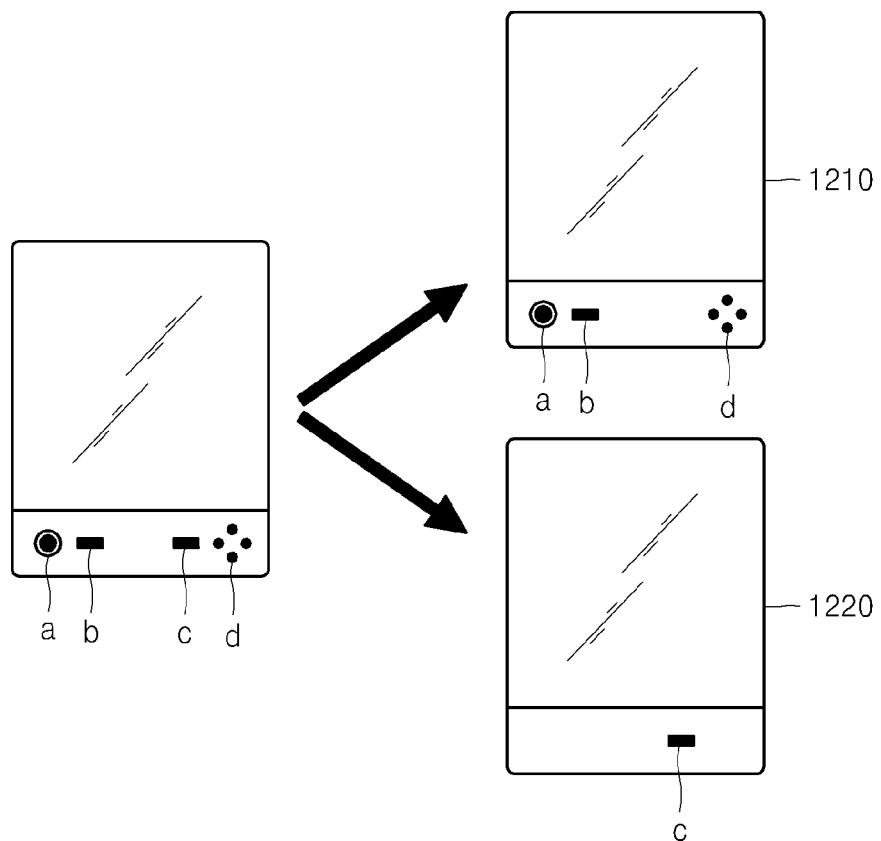
FIG. 12 is a diagram illustrating splitting control rights according to an exemplary embodiment.

As illustrated in FIG. 12, if there are control rights a, b, c, and d for the particular game 1010, the server 300 may assign first control rights including the control rights a, b, and c to the first user terminal 100, and assign a second control right including the control right d to the second user terminal 200.

According to an exemplary embodiment, a set including the first control rights and the second control rights may be preset. Otherwise, a plurality of sets each including at least one from among the first control rights and second control rights may be preset. Control right information may vary according to a processing status, including a current processing status of the particular game.

Then, the server 300 receives accessory participation request information regarding the particular game from the second user terminal 200 (operation S830). Then, the server 300 transmits the control right information, and game streaming data regarding the particular game to the first user terminal 100 or the second user terminal 200 (operation S840). According to an exemplary embodiment, the game streaming data is transmitted to the first user terminal 100 and second user terminal 200 simultaneously.

For example, the server 300 may transmit first control right information to the first user terminal 100, and second control right information to the second user terminal 200. In this case, as illustrated in FIG. 12, the first user terminal 100 may display only information regarding first control rights a, b, and d on a game screen 1210, and the second user terminal 200 may display only information regarding a second control right c on a game screen 1220.

Figure 9:
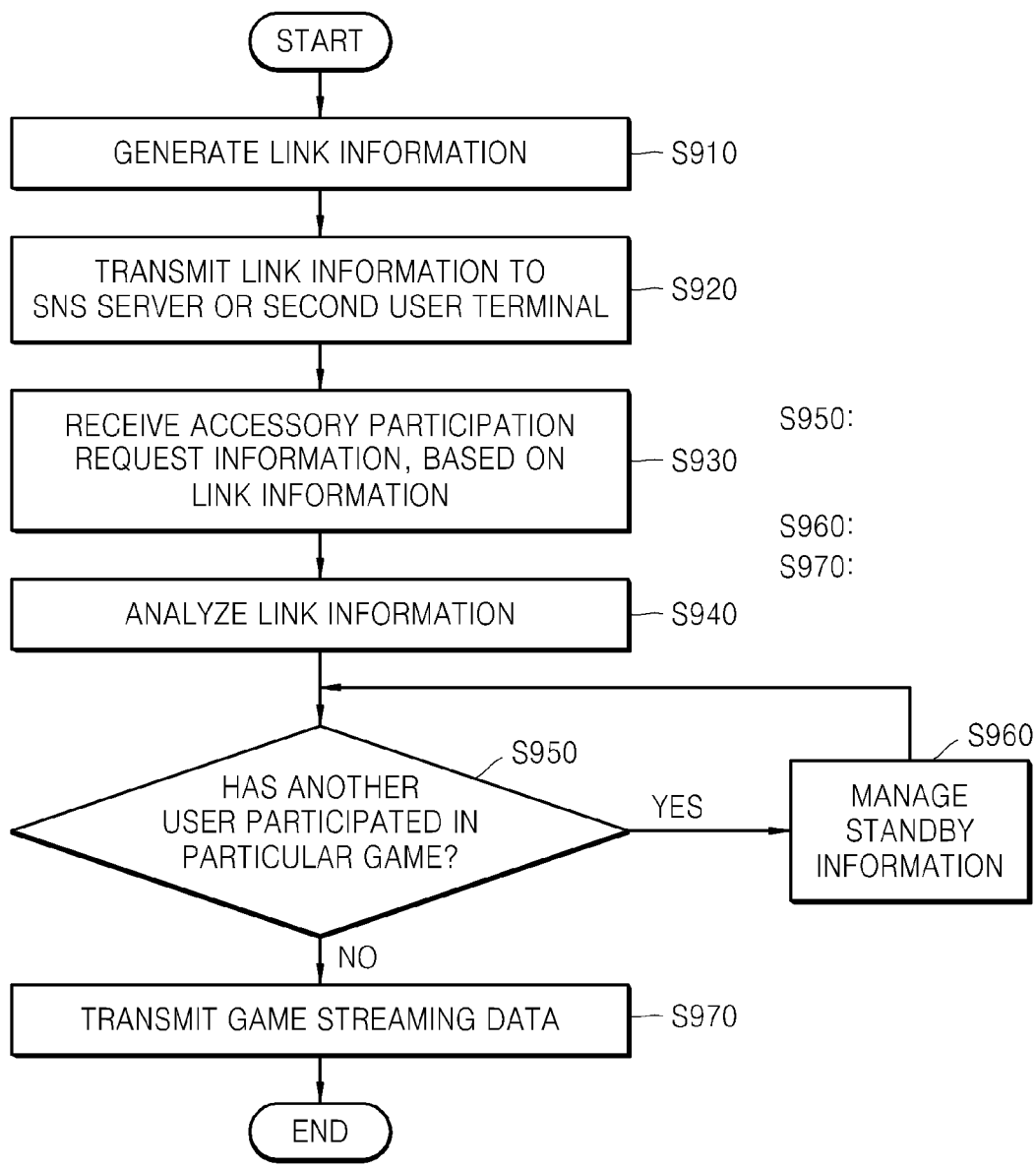
FIG. 9 is a flowchart illustrating a method of providing game streaming data based on link information, according to another exemplary embodiment.

FIG. 9 is a flowchart illustrating a method of providing game streaming data based on link information, according to another exemplary embodiment. In the method of FIG. 9, the server 300 of FIG. 1 creates link information regarding a particular game in which a first user permits accessory participation (operation S910). According to an exemplary embodiment, the server 300 may create the link information, based on at least one from among ID information regarding the particular game and control right information. In other words, according to an exemplary embodiment, the link information may be created, based on the ID information including session information regarding the particular game, and second control right information so that a second user may rapidly access and accessorily participate in the particular game.

FIG. 11 is a diagram illustrating link information according to an exemplary embodiment. Referring to FIG. 11, the link information may include game ID information 1110 and control right information 1120.

Referring back to FIG. 9, the server 300 transmits the link information to an SNS server (not shown) or the second user terminal 200 (operation S920). That is, the server 300 opens the link information, e.g., a URL, on a web in order to lead users to accessorily participate in the particular game.

According to an exemplary embodiment, the second user may use link information to request accessory participation in the particular game. The server 300 receives accessory participation request information from the second user terminal 200, based on the link information (operation S930).

If the second user requests accessory participation based on the link information, then the server 300 analyzes the link information (operation S940). According to an exemplary embodiment, the link information may include ID information regarding the particular game and control right information, and thus, the server 300 may extract the ID information regarding the particular game and/or the control right information by analyzing the link information.

For example, it is assumed that the first user permits accessory participation in a session a of a game A, and the server 300 splits control rights into first control rights (characters X and Y) and second control rights (character Z). In this case, the server 300 may determine that the second user requests accessory participation in the session a of the game A, a range of the first control rights is related to the characters X and Y and a range of the second control rights is related to the character Z by analyzing the link information.

Then, it is determined whether another user is participating in the session of the game A (operation S950). If it is determined in operation S950 that another user is participating in the session a of the game A, the second rights for the character Z are already assigned to the user and the second user thus cannot accessorily participate in the session a of the game A at the present stage. In this case, the server 300 transmits standby information regarding the game A to the second user terminal 200 and manages the standby information (operation S960).

If it is determined in operation S950 that nobody is accessorily participating in the session a of the game A, the server 300 transmits game streaming data to the first user terminal 100 or the second user terminal 200, based on a result of the analyzing (operation S970).

For example, the server 300 may transmit game streaming data regarding the session a of the game A to the first user terminal 100 and the second user terminal 200, and may provide the first control rights for the characters X and Y to the first user terminal 100 and the second control rights for the character Z to the second user terminal 200.

Figure 13:
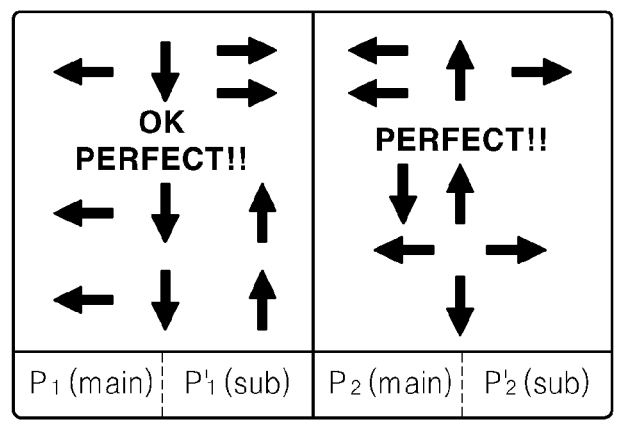
FIG. 13 illustrates a game screen according to an exemplary embodiment.

FIG. 13 illustrates a game screen according to an exemplary embodiment. Referring to FIG. 13, a plurality of first users may be present in the case of a multiplayer game. In this case, each of the first users may permit accessory participation of a second user in this game.

For example, two first users P1 and P2 may be present in the case of a two-player game. In this case, a second user P'1 (sub) may accessorily participate in a particular game of the first user P1 (main), and a second user P'2(sub) may accessorily participate in a particular game of the first user P2 (main). According to an exemplary embodiment, a first player's control rights may be split and assigned to the first user P1 (main) and the second user P'1(sub), and a second player's control right may be split and assigned to the first user P2 (main) and the second user P'2(sub), respectively.

Other exemplary embodiments may be embodied as computer readable code on a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. An example of the computer system may be a controller of a terminal.

While certain exemplary embodiments have been particularly shown and described herein, it will be understood that various changes in form and detail may be made therein without departing from the spirit and scope of the present inventive concept.

What is claimed is:

1. A method of receiving game streaming data from a server, the method comprising:
   obtaining game list information from the server;
   displaying the game list information on an apparatus for receiving game streaming data through a communication network;
   transmitting to the server information regarding a game selected by a first user, and game setting information permitting a second user to participate in the game;
   receiving control right information, game streaming data regarding the game, and link information from the server, wherein the control right information is generated based on the game setting information and comprises at least one from among first control right information, from among a plurality of control right information regarding the game defining ranges of control rights respectively assigned to a plurality of users, defining a range of control rights for the game assigned to the first user, and second control right information, from among the plurality of control right information regarding the game, defining a range of control rights for the game assigned to the second user, and the link information is generated based on the control right information and indicates a uniform resource locator (URL) which is a connection path through which the second user participates in the game selected by the first user; and
   displaying the game streaming data based on the control right information on the apparatus for receiving game streaming data through the communication network,
   wherein the displaying the game streaming data based on the control right information comprises displaying the first control right information and the second control right information in different sizes or colors on the apparatus for receiving game streaming data through the communication network.

2. The method of claim 1, wherein the first control right information and the second control right information vary according to a processing status of the game.

3. The method of claim 1, wherein the game setting information comprises selection information for first control rights and second control rights.

4. The method of claim 1, wherein the link information is generated based on identification information regarding the game.

5. The method of claim 4, further comprising transmitting the link information to at least one from among a social network service (SNS) server and a second user terminal.

6. The method of claim 1, further comprising if the second user participates in the game, receiving participation information of the second user from the server.

7. A non-transitory computer readable recording medium having recorded thereon a program for executing the method of claim 1.

8. An apparatus for receiving game streaming data, the apparatus comprising:
   a display unit which obtains game list information from a server and displays the game list information;
   a transmission unit which transmits to the server information regarding a game selected by the first user, and game setting information permitting a second user to participate in the game;
   a receiving unit which receives control right information, game streaming data regarding the game, and link information from the server, wherein the control right information is generated based on the game setting information and comprises at least one from among first control right information, from among a plurality of control right information regarding the game defining ranges of control rights respectively assigned to a plurality of users, defining a range of control rights for the game assigned to the first user, and second control right information, from among the plurality of control right information regarding the game, defining a range of control rights for the game assigned to the second user, and the link information is generated based on the control right information and indicates a uniform resource locator (URL) which is a connection path through which the second user participates in the game selected by the first user; and a controller which controls the display unit, the transmission unit, and the receiving unit, wherein the controller controls the display unit to display the game streaming data based on the control right information, and to display the first control right information and the second control right information in different sizes or colors.

9. The apparatus of claim 8, wherein the first control right information and the second control right information vary according to a processing status of the game.

10. The apparatus of claim 8, wherein the game setting information comprises selection information for first control rights and second control rights.

11. The apparatus of claim 8, wherein the link information is generated based on identification information regarding the game.

12. The apparatus of claim 11, wherein the transmission unit transmits the link information to at least one from among a social network service (SNS) server and a second user terminal.

13. The apparatus of claim 8, wherein, if the second user participates in the game, the receiving unit receives participation information of the second user from the server.

* * * * *